UNITED STATES PATENT OFFICE.

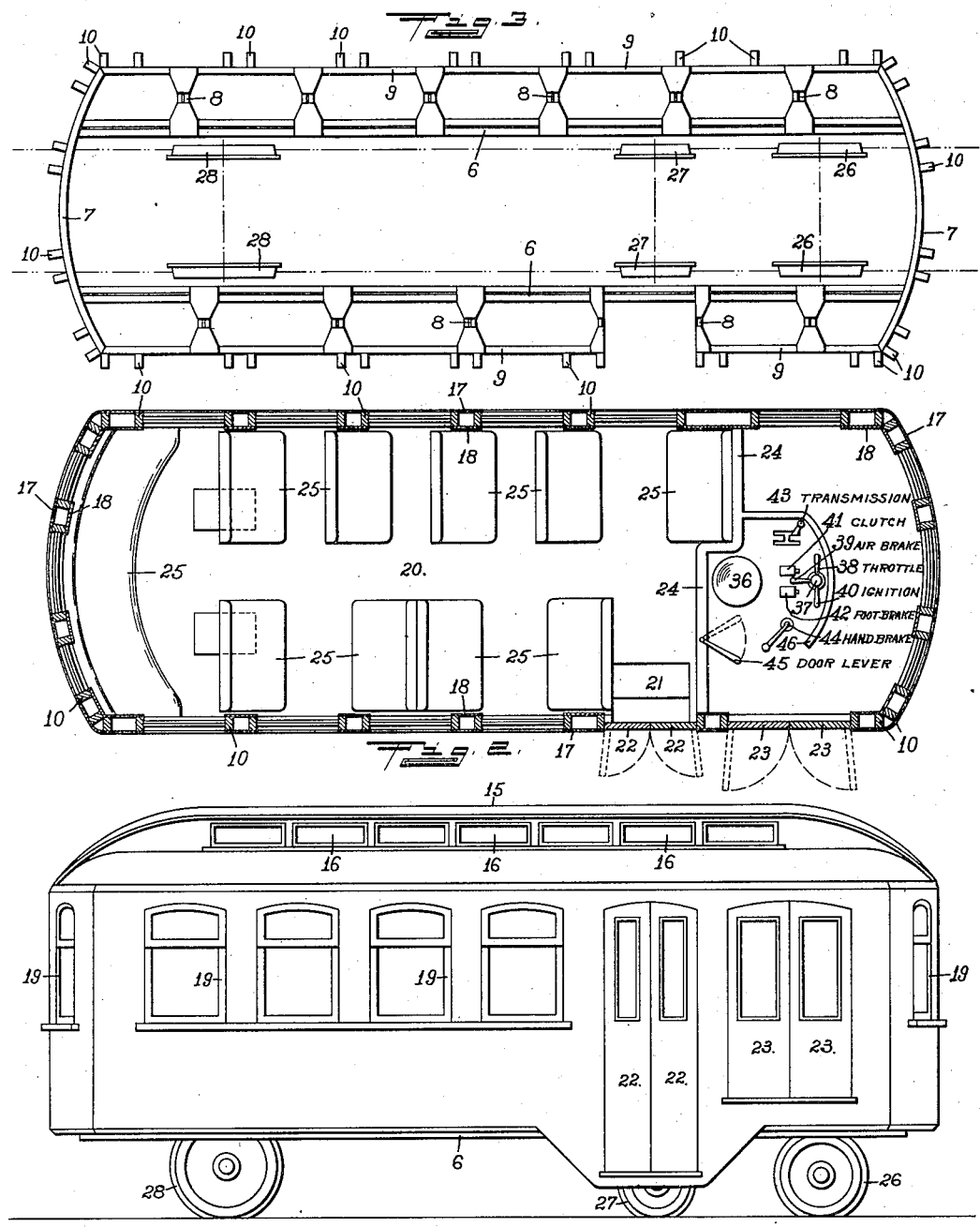

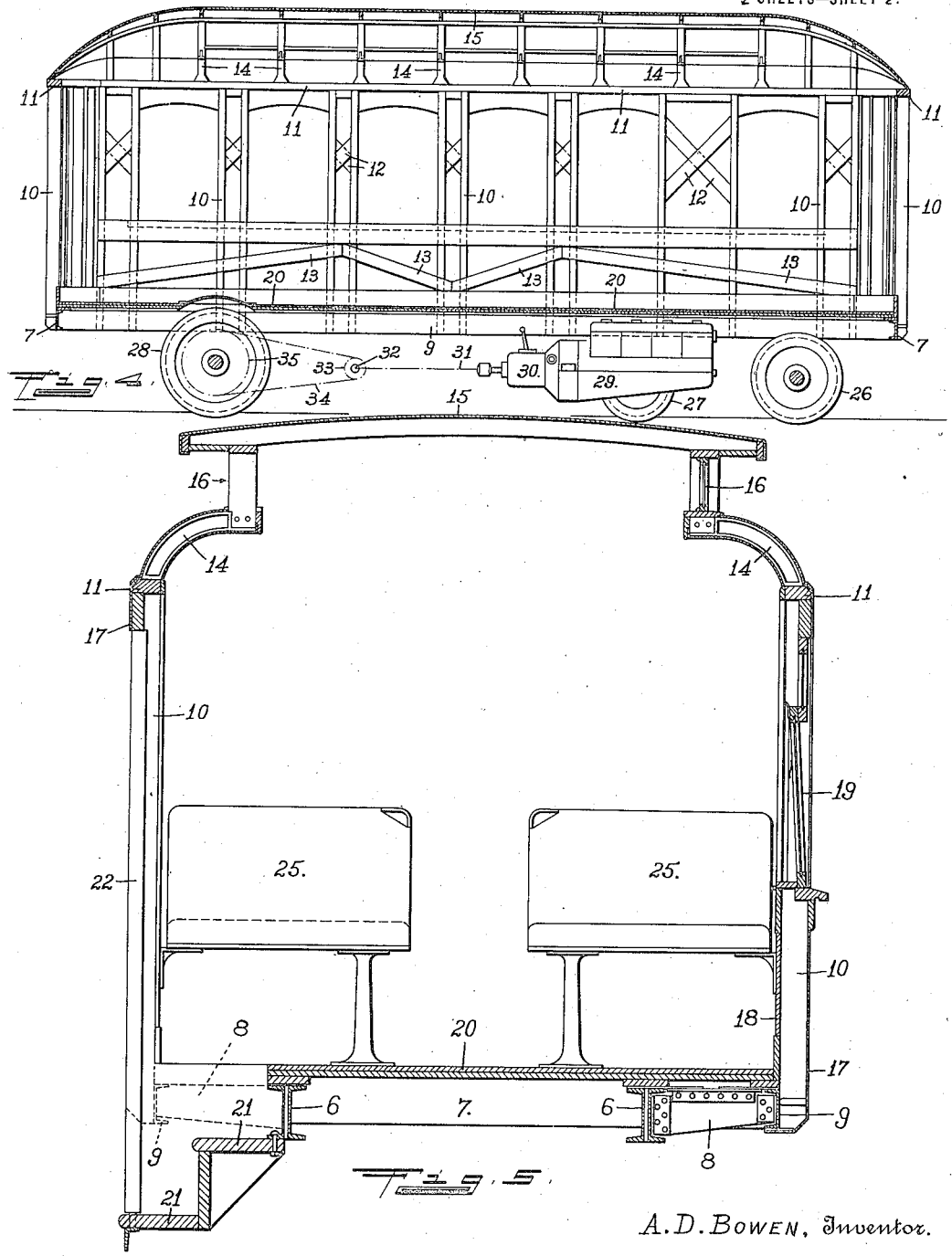

ALFRED D. BOWEN, OF OMAHA, NEBRASKA.

RAILWAY PASSENGER AND EXPRESS MOTOR-CAR.

1,262,577.  Specification of Letters Patent.  Patented Apr. 9, 1918.

Application filed January 17, 1917. Serial No. 142,859.

*To all whom it may concern:*

Be it known that I, ALFRED D. BOWEN, a citizen of the United States, and a resident of Omaha, in the county of Douglas and State of Nebraska, have invented certain new and useful Improvements in Railway Passenger and Express Motor-Cars, of which the following is a specification.

My invention relates to the construction of railway motor-cars, and particularly to cars adapted for transportation of both passengers and express or light baggage. It is the object of my invention to provide a car of this kind especially adapted for economical operation on interburban railways. In pursuance of this object I provide a car which is preferably propelled by an internal-combustion engine, the same operating and being controlled similarly to an ordinary motor-vehicle, and also preferably running on a light narrow-gage railway track, such as may be constructed along public highways with a minimum expense. A further object of my invention is to provide a car having the foregoing characteristics and arranged so that it can be efficiently operated by one person acting in the joint capacity of driver, conductor, and express handler. In pursuance of this object my car has a passenger compartment with a single door-opening, located so that the passengers enter and leave the car in proximity to the driver's station, the door being near the track-level and being opened and closed by the driver without moving from his station. The car also has a compartment for express, baggage and light freight, said compartment having a separate door thereto opening at a level such as to be accessible at the outside of the car from a raised platform or the like adjacent to the track. Further objects of my invention relate to the particular construction and arrangement of the light, strong and inexpensive car-body required for effecting the more general objects of the invention.

In the accompanying drawings, Figure 1 is a side view of a car embodying my invention, Fig. 2 is a horizontal section and floor-plan thereof, Fig. 3 is a detail plan of the principal floor-framing thereof, Fig. 4 is a longitudinal section of the body-framing, showing the driving mechanism diagrammatically, and Fig. 5 is a transverse section of the car-body through the passenger-door thereof.

In the illustrated embodiment of my invention the car-body has two principal longitudinal frame-members or sills 6 which are of metal and are spaced transversely intermediate the sides and the longitudinal center-line of the body. The sills 6 are connected at their ends by bowed or arcuate end-beams 7, and the intermediate portions thereof are connected to each other by various transverse members (not shown), such as the bolsters or transoms for the trucks, and the members required for supporting the motor and power-transmission mechanism. To the main sills 6 are secured a series of cantalivers 8 which extend laterally therefrom as shown in Fig. 3, and carry at their ends the side-sills 9 which are lighter and of less depth than the main sills 6. The ends of the side-sills are suitably connected with the ends of the bowed end-beams 7, and to the outer sides of the members 7 and 9 are anchored the lower ends of the principal side-frame-members or studs 10. The latter may be of wood and are arranged in pairs suitably spaced to provide places for the windows and doors of the car-body. The upper ends of the studs are connected to each other by suitable transom-plates 11 following the contour of the body, and below and between the window-openings the studs are connected by suitable diagonal bracing-members 12 and 13 arranged to lie between the planes of the inner and outer surfaces of the studs. The side-portions of the roof have arched metal frame-members 14 resting on the transom-plates 11, as shown in Fig. 5. The main roof 15 is slightly arched transversely, and is curved downwardly at the front and rear ends, while the intermediate longitudinal portions are spaced from the side-arch-members 14 to provide place for the ventilators 16.

To the described body-framing there is applied an outer sheeting 17, preferably of metal, and suitable interior finish 18 which may be of wood. The sides and front and rear ends of the car-body are provided with windows of which the main sash 19 may be lowered into compartments formed beneath them in the spaces between the studs 10. Suitable flooring 20 is laid upon the deck-frame formed by the main sills 6, cantalivers 8 and side-sills 9. At one side of the body between two of the cantalivers 8, a portion of the side-sill is omitted, and adjoining the same the flooring 20 is omitted

freight and a rear passenger-compartment, both compartments having the same floor-level, a side-door for the front compartment, car-controlling mechanism located within the front compartment near the transverse partitioning means, a side-door for the rear compartment forming the sole entrance to and exit from said compartment, said door extending below the floor-level, and steps within the car and leading from said door up to the floor-level and terminating adjacent to the transverse partitioning means.

A. D. BOWEN.